June 4, 1929.  J. H. McEVOY, JR  1,715,508
PLUG FOR STRAINER PIPES
Filed Feb. 6, 1926

Joseph H. McEvoy Jr. Inventor

By Jesse R. Stone

Attorney

Patented June 4, 1929.

1,715,508

UNITED STATES PATENT OFFICE.

JOSEPH HENRY McEVOY, JR., OF HOUSTON, TEXAS.

PLUG FOR STRAINER PIPES.

Application filed February 6, 1926. Serial No. 86,445.

My invention relates to strainer plugs employed in forming the filter openings in a pipe or tube.

In forming well strainers adapted for use in deep wells for oil, water and gas, it is now common to form openings in the pipe and fix in these openings plugs in which are cut strainer openings of varying sizes or widths. Ordinarily the openings comprise slots cut in the plug of the desired width and the widths vary according to the size of the sand or other foreign material contained in the liquid.

It is an object of the invention to provide a screen plug or button which will be strong and substantial and which may yet be made in large sizes to fit openings in the pipe of larger diameter than those now ordinarily employed.

It is also desired that the plug be reinforced most strongly where the same is most liable to injury.

Figure 1:
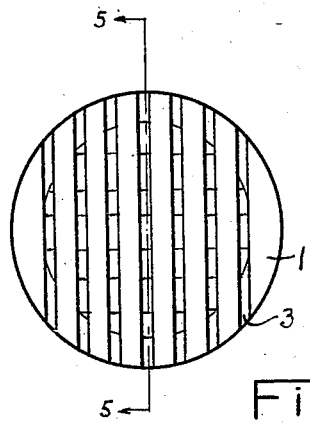
Figure 5:
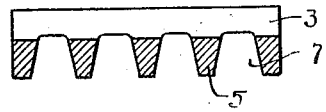
Figure 2:
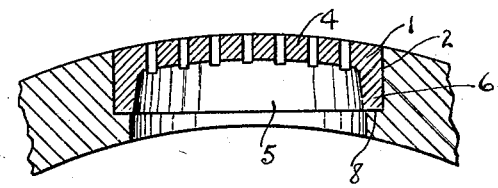
Figure 3:
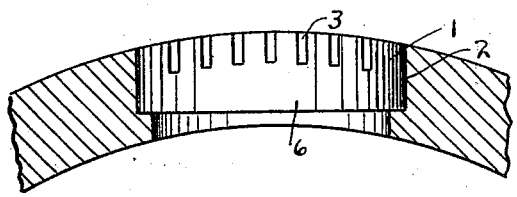
Figure 4:
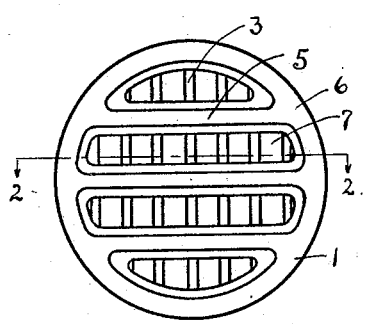

Referring to the drawing herewith, Fig. 1 is a top plan view of a strainer plug embodying my invention. Fig. 2 is a transverse section through a strainer plug showing the same fitting within an opening in a broken section of strainer pipe. Fig. 3 is a view similar to Fig. 2, illustrating the plug in side elevation. Fig. 4 is a bottom plan view of the plug, and Fig. 5 is a transverse section through the plug taken on the plane 5—5 of Fig. 1. Like numerals of reference are employed to designate like parts in all the views.

In forming a plug adapted to fit within the openings of large diameter in the pipe, it is desired that the said plug conform in the curvature of its outer face to that of the pipe in which it is fitted. In this manner, the plug is curved in one plane but not in the other. I, therefore, form the body 1 of the blank with a curved outer surface and a plane inner surface. The outer surface, however, is curved so that when the plug is fitted within the openings 2 in the pipe, the outer face of the plug will conform to that of the pipe, as best shown in Figs. 2 and 3.

Plugs of large diameter must also be made as strong as possible and firmly supported within the pipe. In forming a plug for this purpose, I cut transverse slots 3 therein, preferably in a direction which will be parallel with the axis of the pipe in which the plugs are fitted. These slots are spaced uniformly across the plug parallel with each other, as indicated in Fig. 1. On the inner side of the plug, I contemplate reinforcing the outer wall 4 in which the slots are cut by ribs 5 formed transversely of the slots and connecting with the outer rim 6 of the plug. These ribs may best be formed by casting the plugs with the ribs thereon and by cutting the slots 3 to connect with the inner troughs of the spaces between the ribs, or the plug may be stamped so as to form the troughs 7 with the ribs 5 between them.

It is to be noted that the ribs 5 are intended only for reinforcement of the outer wall 4 of the plug and that the space between them may, therefore, be made materially greater than the ordinary width of the slots in said outer wall 4. In Fig. 5 a section parallel with the slots 3 is shown, and in Fig. 2 a section at right angles thereto is indicated. It will be noted that the ribs 5 connecting across from the rim 6 on one side to the rim on the other are thicker centrally of their length than they are at the ends, thus strengthening the plug and it is, therefore, strongest where it most needs support.

The plug is seated within an opening 2 in the pipe and the inner end of the plug seats upon a shoulder 8 to limit the inward movement of the plug, as shown. It is contemplated that the walls of the opening 2 may be clinched about the margin of the button in any well known manner so as to hold it firmly in position.

The advantage of this form of button is that it makes it possible to use a strainer plug of large diameter and reinforce the said plug in such manner that it will be able to withstand the strains to which it is subjected. The further objects and advantages will be obvious to those skilled in the art.

What I claim as new and desire to protect by Letters Patent is:

1. A well strainer plug for use in strainer pipe, said plug having its inner face cut in a plane perpendicular to its axis, and its outer face cut to conform to the curvature of the pipe, said outer face having slots therein, and a series of spaced ribs below said slots transversely thereof, for the purpose described.

2. A well strainer plug for use in strainer pipe, said plug having its inner face cut in a plane perpendicular to its axis, and its outer face cut to conform to the curvature of the pipe, said outer face having slots therein, and a series of spaced ribs below said slots transversely thereof, the depth of the several slots being uniform, whereby the spaced ribs have a greater depth at the center than at the ends.

In testimony whereof I hereunto affix my signature this 26th day of December, A. D. 1925.

JOSEPH HENRY McEVOY, Jr.